(12) United States Patent
Oh

(10) Patent No.: US 6,186,572 B1
(45) Date of Patent: Feb. 13, 2001

(54) FULL FLOATING DEVICE OF A REAR SEAT CUSHION FOR AN AUTOMOBILE

(75) Inventor: Dong Hwan Oh, Ulsan (KR)

(73) Assignee: Hyundai Motor Company, Seoul (KR)

( * ) Notice: Under 35 U.S.C. 154(b), the term of this patent shall be extended for 0 days.

(21) Appl. No.: 09/438,962

(22) Filed: Nov. 12, 1999

(30) Foreign Application Priority Data

May 17, 1999 (KR) .................................................. 99-017673

(51) Int. Cl.$^7$ ............................... B60N 2/02; B60N 2/10; B60N 2/16
(52) U.S. Cl. ..................................... 296/65.05; 296/65.01; 296/65.08; 296/65.18; 297/337; 297/338; 297/339
(58) Field of Search ............................... 296/65.05, 65.01, 296/65.08, 65.15, 65.18; 297/337, 338, 339

(56) References Cited

U.S. PATENT DOCUMENTS

| | | | |
|---|---|---|---|
| 3,784,147 | * | 1/1974 | Harder, Jr. ............................ 248/371 |
| 4,880,268 | * | 11/1989 | Brambilla ............................ 296/65.1 |
| 4,884,843 | * | 12/1989 | DeRees ................................. 297/331 |
| 5,143,421 | * | 9/1992 | Voss et al. ............................ 297/338 |
| 5,558,386 | * | 9/1996 | Tilly et al. ........................... 296/65.1 |
| 5,676,424 | * | 10/1997 | Winkelhake ......................... 297/337 |
| 5,882,061 | * | 3/1999 | Guillouet ........................... 296/65.05 |
| 6,024,411 | * | 2/2000 | Pesta et al. ........................... 297/325 |

\* cited by examiner

*Primary Examiner*—D. Glenn Dayoan
*Assistant Examiner*—Greg Blankenship

(57) ABSTRACT

A full floating device of a rear seat cushion for an automobile comprises a fixed frame fixed on a floor panel of the automobile, a pivot frame to which the end of the supporting bracket is linked by a pivot pin and on which a seat cushion is mounted, and an angle adjusting means pivoting the rear end of the pivot frame about the pivot pin in order to adjust the inclination of the seat cushion mounted on the pivot frame. The device in accordance with the present invention can adjust the angle of the rear seat cushion of the automobile according to the condition of the passenger, and the passenger can be comfortable.

1 Claim, 2 Drawing Sheets

FULL FLOATING DEVICE OF A REAR SEAT CUSHION FOR AN AUTOMOBILE

FIELD OF THE INVENTION

The present invention relates to a seat cushion of an automobile, more particularly a full floating device of a rear seat cushion for an automobile, which can fully adjust the angle of the rear seat cushion and can eliminate inconvenience caused by the wheel housing protruding into the inner space from the rear side of the automobile.

BACKGROUND OF THE INVENTION

Generally, both sides of the rear seat cushion of the automobile contacts with the wheel housing in which a tire is positioned and the rear seat cushion cannot adjust the angle thereof. Then the wheel housing protrudes into the inner space from the side body of the automobile. Therefore, when the rear seat is fully occupied, the side passenger does not feel well since the wheel housing contacts the waist of the passenger.

Furthermore, the passenger who may be an elderly person or a small child can get injured by the wheel housing protruding into the inner space from the side body of the automobile when the automobile collides with other automobile etc.

SUMMARY OF THE INVENTION

The object of the present invention is to provide a full floating device of a rear seat cushion for an automobile that can adjust the angle thereof and can make the passenger comfortable.

The present invention comprises a fixed frame fixed on a floor panel of an automobile, a pivot frame to which the end of the supporting bracket is linked by a pivot pin and on which a seat cushion is mounted, and an angle adjusting means pivoting the rear end of the pivot frame about the pivot pin in order to adjust the inclination of the seat cushion mounted on the pivot frame.

The angle adjusting means comprises a first pivot arm to which the rear end of the fixed frame is pivotally linked; a second pivot arm to which one end of the first pivot arm and the rear end of the pivot frame are pivotally linked; a spring connected between a pivot shaft and a seat cushion frame so that the second pivot arm can be pivoted by the elastic force of the spring; and a lock release means for releasing the locking state of the pivot frame by the elastic force of the spring.

The lock release means comprises a stopper to which the pivot frame is pivotally linked and having a teeth portion engaged with a teeth portion formed on the second pivot arm; a cam to which the pivot frame is pivotally linked and pushing a stopper so that the teeth portion of the stopper is disengaged with the teeth portion of the second pivot arm; a lever pivotally linked to the pivot frame; a link rotating the cam so that the teeth portion of the stopper and the teeth portion of the second pivot arm are selectively engage or disengaged each other by pivoting the lever, and a torsion spring mounted between the stopper and the pivot frame for giving a torque to the lever and returning it to the original position.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PRESENT INVENTION

Figure 1:
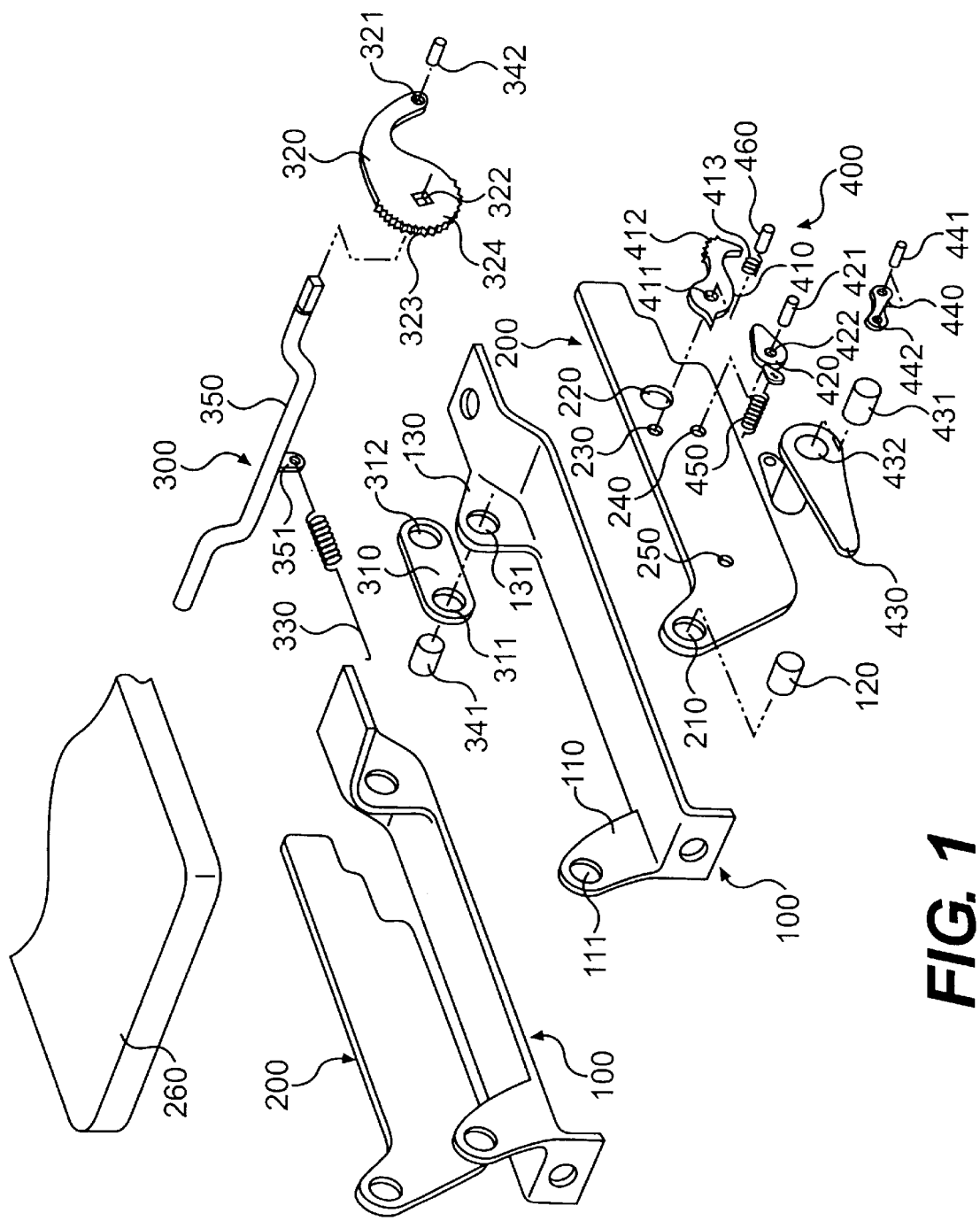
FIG. 1 is a disassembled perspective view of the full floating device of a rear seat cushion in accordance with the present invention.
Figure 2:
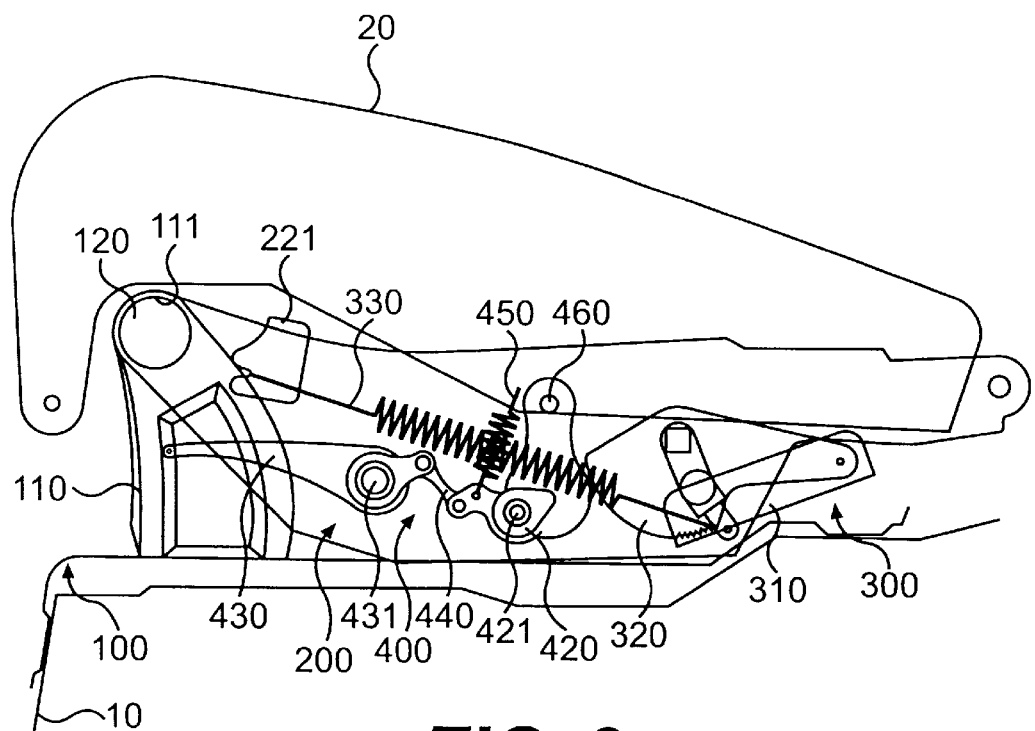
FIG. 2 is a side view of the assembled device in accordance with the present invention that the cushion of the seat is inclined toward rear side.

FIG. 1 shows an embodiment of a full floating device of a rear seat cushion for the automobile in accordance with the present invention. The full floating device comprises a fixed frame 100 fixed on a floor panel 10 of the automobile having a supporting bracket 110 provided a pivot hole 111 through which a pivot pin 120 is inserted, a pivot frame 200 having a pivot hole 210 through which the pivot pin 120 is so inserted that the end of the supporting bracket 110 is linked to the pivot frame 200 and a seat cushion 20 is mounted thereon, and an angle adjusting means 300 turning the rear end of the pivot frame 200 about the pivot pin 120 in order to adjust the inclination of the seat cushion mounted on the pivot frame 200.

The angle adjusting means 300 comprises a first pivot arm 310 having pin holes 311, 312 through which a pivot pin 341 is inserted so that the first pivot arm 310 is linked to the rear end of the fixed frame 100, a second pivot arm 320 having a pin hole 321 through which the one end of the first pivot arm 310 is pivotally linked by a pivot pin 342 and having a pin hole 322 through which the rear end of the pivot frame 200 is pivotally linked by a pivot shaft 350, a spring 330 connected between a spring bracket 351 provided on the pivot shaft 350 and a bracket 221 provided on a seat cushion frame 260 so that the second pivot arm 320 is pivoted by the elastic force of the spring 330, and a lock release means 400 for releasing the locking state of the pivot frame 200 by the elastic force of the spring 330.

A pin bracket 130 having a pin hole 131 is provided on rear end of the fixed frame 100 and a shaft hole 220 through which the pivot shaft 350 is inserted is formed on the pivot frame 200. The spring 330 pulls the pivot shaft 350 connected with the second pivot arm 320 so that the first pivot arm 310 and the second pivot arm 320 folded together are unfolded to have a certain angle there between.

The lock release means 400 comprises a stopper 410 having a pin hole 411 through which the pivot frame 200 is pivotally linked to the one end of the stopper 410 and having a teeth portion 412 engaged with a teeth portion 323 formed on the plate part 324 of the second pivot arm 320, a cam 420 having pin hole 422 through which the pivot frame 200 is pivotally linked to the cam 420 and pushing the stopper 410 so that the teeth portion 412 of the stopper 410 disengages the teeth portion 323 of the second pivot arm 320, a lever 430 having a pin hole 432 through which the pivot frame 200 is linked by a pin 431, a link 440 having pin holes 442, 443 through which a connecting pin 441 is inserted and turning the cam 420 so that the teeth portion 412 of the stopper 410 and the teeth portion 323 of the second pivot arm 320 selectively engage or disengage each other by pivoting the lever 430, and a torsion spring 450 mounted between the stopper 410 and the pivot frame 200 for giving a torque to the lever 430 and returning it to the original position.

The pivot frame 200 has three pin holes 230, 240, 250 through which the stopper 410, the lever 430 and the cam 420 are respectively linked by pin 460, 421, 431 each other. And the teeth portion of the stopper 410 is pivoted about the pivot shaft 350.

A torsion spring 413 is mounted on the pin 460 that is inserted into a pin hole 411 formed on the stopper 410. The ends of the spring 413 are connected to the pivot frame 200 and the stopper 410, respectively. Therefore, when the pushing force of the cam 420 that pushes the stopper 410 is released, the teeth portion 412 of the stopper 410 is elastically disengaged with the teeth portion 323 of the second pivot arm 320.

With the embodiment in accordance with the present invention, when the need for changing the angle of the rear seat cushion is required according to the condition of the passenger on the rear seat, the operator pulls the lever 430 upward. Then the link 440 linked to the lever 430 rotates the cam 420 that pushes the stopper 410 so that the teeth portion 412 of the stopper 410 is disengaged with the teeth portion 323 of the second pivot arm 320.

Figure 3:
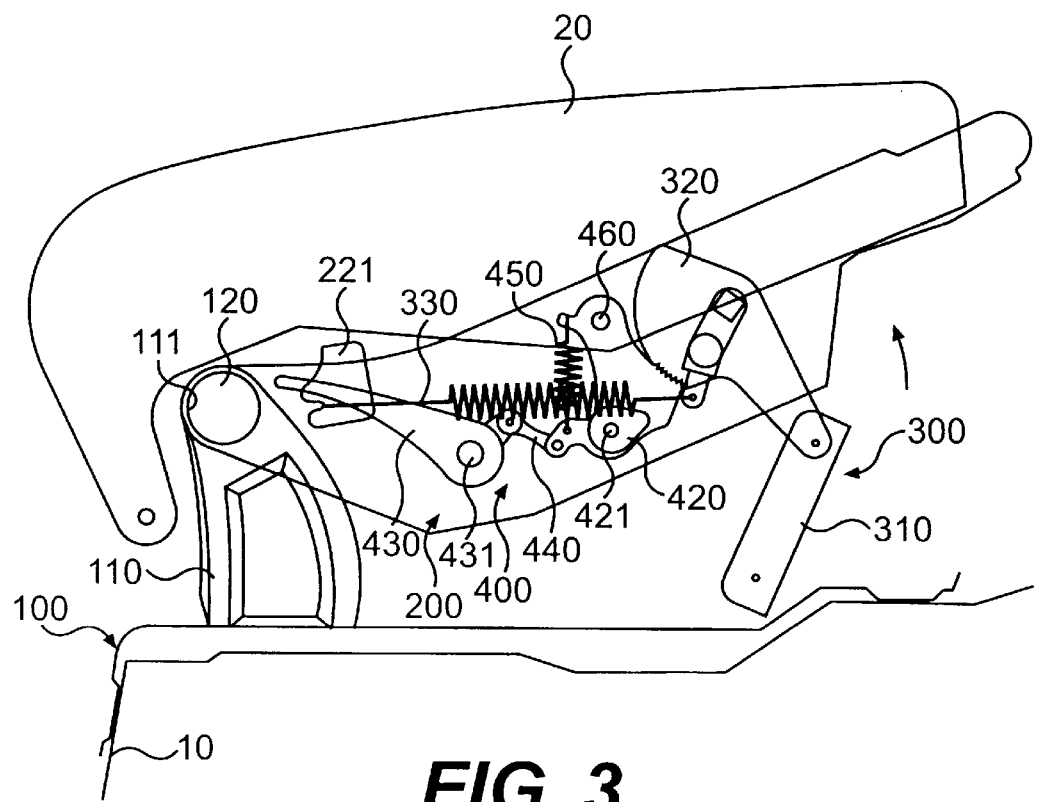
FIG. 3 is a side view of the assembled device in accordance with the present invention, that the cushion of the seat is adjusted to incline toward the front side.

Next the second pivot arm 320 is rotated by the elastic force of the spring 330 connected to the pivot shaft 350 and the second pivot arm 320 rotates the first pivot arm 310 connected to the second pivot arm 320. Then the folded the first arm 310 and the second arm 320 are unfolded and the rear end of the pivot frame 200 is rotated about the pivot pin 120. Therefore the rear end of the seat cushion mounted on the pivot frame 200 is moved upward and inclined forward as shown in FIG. 3.

After the adjustment of the angle of the seat cushion is finished, the lever 430 is released. Then the cam 420 is rotated by the return force of the torsion spring 420 pushes the stopper 410, and the teeth portion of the stopper 410 is engaged with the teeth portion 323 of the second pivot arm 320.

Therefore the position of the rear seat cushion is changed by the adjustment of the angle of the rear seat cushion, the rear seat cushion is positioned above the protrusion part of the wheel housing of the automobile. And the hindrance by the wheel housing to the passenger can be eliminated.

Finally, to return the rear seat cushion to original position or bring down the rear end of the seat cushion, firstly the engagement between the teeth portion 412 of the stopper 410 and the teeth portion 323 of the second pivot arm 320 must be released by pulling the lever 430 upward, and then the operator or the passenger pushes the rear end of the seat cushion downward. When the rear end of the seat cushion is lowered to a desired position, the pulling of the lever 430 is released and the teeth portion 412 of the stopper 410 and the teeth portion 323 of the second pivot arm 320 become engaged. Therefore the stopper 410 is locked and the position of the seat cushion is set.

As described above, since full floating device in accordance with the present invention can adjust the angle and the position of the rear seat cushion, the passenger occupied on the rear seat can adjust the state of the rear seat cushion according to his conditions. Therefore the wheel housing protruded from the side body of the automobile does not hinder the passenger and the passenger can be comfortable.

What is claimed is:

1. A full floating device of a rear seat cushion for an automobile comprising:

a fixed frame fixed on a floor panel of the automobile;

said fixed frame having a supporting bracket with an end;

a pivot frame linked by a pivot pin to the end of a supporting bracket;

the rear seat cushion being mounted on said pivot frame; and an angle adjusting means pivoting a rear end of the pivot frame about the pivot pin in order to adjust the inclination of the rear seat cushion mounted on the pivot frame, the angle adjusting means including a first pivot arm to which a rear end of a fixed frame is pivotally linked, a second pivot arm to which one end of the first pivot arm and the rear end of the pivot frame are pivotally linked, a spring connected between a pivot shaft and a seat cushion frame for the rear seat cushion so that the second pivot arm can be pivoted by the elastic force of the spring; and a lock release means for releasing a locking state of the pivot frame by the elastic for of the spring, the lock release means including a stopper to which the pivot frame is pivotally lined and having a teeth portion engaged with a teeth portion formed on the second pivot arm; a cam to which the pivot frame is pivotally linked and pushing a stopper so that the teeth portion of the stopper disengage the teeth portion of the second pivot arm; a lever pivotally linked to the pivot frame; a link rotating the cam so that the teeth portion of the stopper and the teeth portion of the second pivot arm selectively engage of disengage each other by pivoting the lever, and a torsion spring mounted between the stopper and the pivot frame for giving a torque to the lever and returning it to an original position.

* * * * *